United States Patent
Vater et al.

(10) Patent No.: US 7,602,916 B1
(45) Date of Patent: Oct. 13, 2009

(54) ACCESS-PROTECTED DATA CARRIER

(75) Inventors: Harald Vater, Giessen (DE); Hermann Drexler, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/763,621

(22) PCT Filed: Sep. 7, 1999

(86) PCT No.: PCT/EP99/06580

§ 371 (c)(1),
(2), (4) Date: Apr. 26, 2001

(87) PCT Pub. No.: WO00/16272

PCT Pub. Date: Mar. 23, 2000

(30) Foreign Application Priority Data

Sep. 11, 1998 (DE) ................................ 198 41 676

(51) Int. Cl.
*H04L 9/00* (2006.01)
(52) U.S. Cl. ................ 380/263; 380/28; 380/29; 713/189
(58) Field of Classification Search ........... 380/263, 380/235, 28, 29; 340/825; 713/189
See application file for complete search history.

(56) References Cited

U.S. PATENT DOCUMENTS

| | | | | |
|---|---|---|---|---|
| 4,549,075 A | * | 10/1985 | Saada et al. | 713/169 |
| 5,153,581 A | * | 10/1992 | Hazard | 340/5.8 |
| 2001/0053220 A1 | * | 12/2001 | Kocher et al. | 380/29 |

OTHER PUBLICATIONS

Bruce Schneier, Applied Cryptography, 1996, John Wiley & Sons, Second Edition, pp. 349-353, 366-367.*
US 5,748,741, 05/1998, Johnson et al. (withdrawn)*

* cited by examiner

*Primary Examiner*—Carl Colin
(74) *Attorney, Agent, or Firm*—Bacon & Thomas, PLLC

(57) ABSTRACT

The invention relates to a data carrier having a semiconductor chip (5) with at least one memory. The memory contains an operating program that is able to perform at least one operation (h). In order to prevent unauthorized access to the data (x) processed with the operation (h), both said data and the operation (h) itself are disguised. The disguising of the data (x) and the operation (h) is coordinated such that the disguised operation ($h_{R_1R}$, $h_{R_1R_2}$) generates either the output data (y) of the undisguised operation (h) or disguised output data (y$\otimes$R$_2$) from which the output data (y) can be determined.

16 Claims, 2 Drawing Sheets

FIG. 3A

| x    | 00 | 01 | 10 | 11 |
|------|----|----|----|----|
| h(x) | 01 | 11 | 10 | 00 |

FIG. 3B

| x          | 11 | 10 | 01 | 00 |
|------------|----|----|----|----|
| $h_{R1}(x)$ | 01 | 11 | 10 | 00 |

FIG. 3C

| x          | 00 | 01 | 10 | 11 |
|------------|----|----|----|----|
| $h_{R1}(x)$ | 00 | 10 | 11 | 01 |

FIG. 3D

| x             | 00 | 01 | 10 | 11 |
|---------------|----|----|----|----|
| $h_{R1R2}(x)$ | 10 | 00 | 01 | 11 |

ACCESS-PROTECTED DATA CARRIER

BACKGROUND OF THE INVENTION

1. Field of the Invention

This invention relates to a data carrier having a semiconductor chip in which secret data are stored. The invention relates in particular to a smart card.

2. Description of Related Art

Data carriers containing chips are used in a great number of different applications, for example for performing monetary transactions, paying for goods or services, or as an identification means for access or admission controls. In all said applications the data carrier chip normally processes secret data which must be protected from access by unauthorized third parties. Said protection is ensured by, among other things, giving the inner structures of the chip very small dimensions so that it is very difficult to access said structures with the aim of spying out data processed in said structures. In order to impede access further, one can embed the chip in a very firmly adhering compound whose forcible removal destroys the semiconductor plate or at least the secret data stored therein. It is also possible to provide the semiconductor plate during its production with a protective layer which cannot be removed without destroying the semiconductor plate.

With corresponding technical equipment, which is extremely expensive but nevertheless fundamentally available, an attacker could possibly succeed in exposing and examining the inner structure of the chip. Exposure could be effected for example by special etching methods or a suitable grinding process. The thus exposed structures of the chip, such as conductive paths, could be contacted with microprobes or examined by other methods to determine the signal patterns in said structures. Subsequently, one could attempt to determine from the detected signals secret data of the data carrier, such as secret keys, in order to use them for purposes of manipulation. One could likewise attempt to selectively influence the signal patterns in the exposed structures via the microprobes.

SUMMARY OF THE INVENTION

The invention is based on the problem of protecting secret data present in the chip of a data carrier from unauthorized access.

The inventive solution does not aim, like the prior art, at preventing exposure of the internal structures of the chip and the mounting of microprobes. Instead measures are taken to make it difficult for a potential attacker to infer secret information from any signal patterns intercepted. Said measures consist according to the invention in manipulating security-relevant operations so that the secret data used in performing said security-relevant operations cannot be determined without including further secret information. For this purpose the security-relevant operations are disguised or falsified with the aid of suitable functions before execution. In order to impede or even prevent in particular a statistical evaluation in case of multiple execution of the security-relevant operations, a random component enters into the disguising function. As a result, an attacker cannot determine the secret data from any data streams intercepted.

The security-relevant operation will be represented in the following by function h mapping input data x on output data y, i.e. $y=h(x)$. To prevent secret input data x from being spied out the invention provides, in one example, for a disguised function $h_{R1}$ to be determined, so that the following holds:

$$h(x) = h_{R1}(x \odot R_1)$$

as shown in FIGS. 3a-3c, or in a variation of the basic disguising operation, for disguised function $h_{R1R2}$ to be determined, so that the following holds:

$$y \odot R_2 = h_{R1R2}(x \odot R_1),$$

as shown in FIG. 3d.

The security-relevant operation is now performed by means of disguised function $h_{R1R2}$ whose input data are not authentic secret data x but disguised secret data $x \odot R_1$ generated by combining authentic secret data x with random number $R_1$. Without knowledge of random number $R_1$ one cannot determine authentic secret data x from disguised secret data $x \odot R_1$. As a result of applying disguised function $h_{R1R2}$ to disguised secret data $x \odot R_1$ one obtains disguised output data $y \odot R_2$. From disguised output data $y \odot R_2$ one can determine output data y by suitable combination. Before each new execution of the security-relevant function one can preset new random numbers $R_1$ and $R_2$ from which new disguised function $h_{R1R2}$ is determined in each case. Alternatively, a plurality of disguised functions $h_{R1R2}$ can be permanently stored, one of which is selected randomly before execution of the security-relevant operation. It is especially advantageous to use two functions $h_{R1R2}$ and $h_{R1'R2'}$, random numbers $R_1'$ and $R_2'$ being the inverse values of random numbers $R_1$ and $R_2$ with respect to the type of combination selected for disguising. In a further variant, random numbers $R_1$ and $R_2$ can also be identical. In particular, random numbers $R_1$ and $R_2$ can be selected statistically independently so that there is no correlation between input and output data which can be used for an attack.

If further operations are executed before or after security-relevant operation h in question here, random numbers $R_1$ and $R_2$ can also be used for disguising the data processed with the further operations.

The inventive solution can be used especially advantageously for security-relevant operations containing nonlinear functions. With nonlinear functions one cannot apply known protective measures based on disguising the secret data before execution of the functions. Known protective measures presuppose that the functions are linear with respect to the disguising operations so that disguising can be undone after execution of the functions. In the inventive solution, however, not only the secret data are falsified or disguised but also the security-relevant operations processing the secret data. The disguising of the secret data and the security-relevant operations is coordinated such that the authentic secret data can be derived from the disguised secret data after execution of the security-relevant operations. Coordination between disguising of the secret data and the security-relevant operations can be realized especially simply if the security-relevant operations are realized in the form of tables, so-called lookup tables. In the stated tables each input value x has output value y associated therewith. The functions realized by the tables are executed by looking up output values y belonging to particular input values x.

BRIEF DESCRIPTION OF THE DRAWINGS

The invention will be explained below with reference to the embodiments shown in the figures, in which:

FIGS. 3a, 3b, 3c and 3d show representations of lookup tables.

DETAILED DESCRIPTION OF THE PREFERRED EMBODIMENTS

Figure 1:
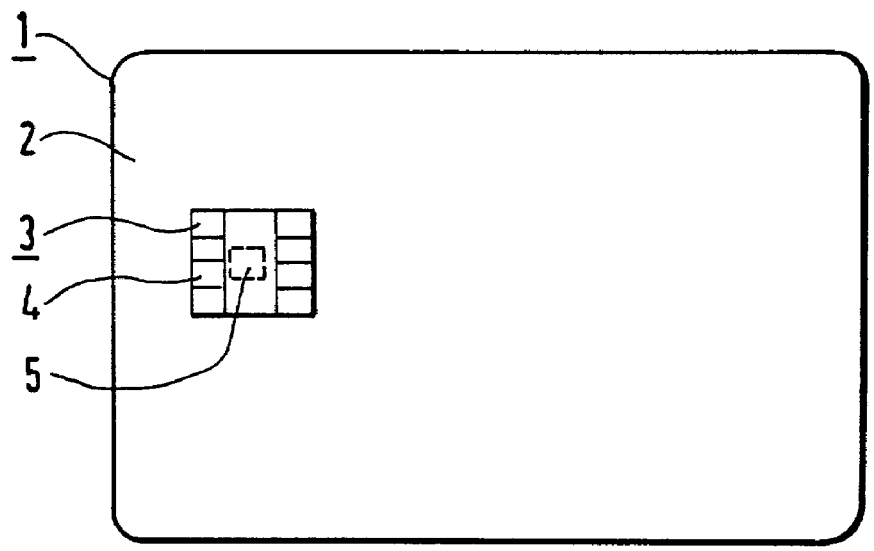
FIG. 1 shows a smart card in a top view.

FIG. 1 shows smart card 1 as an example of the data carrier. Smart card 1 is composed of card body 2 and chip module 3 set in a specially provided gap in card body 2. Essential components of chip module 3 are contact surfaces 4 for producing an electric connection with an external device, and chip 5 electrically connected with contact surfaces 4. As an alternative or in addition to contact surfaces 4, a coil not shown in FIG. 1 or other transfer means can be present for producing a communication link between chip 5 and an external device.

Figure 2:
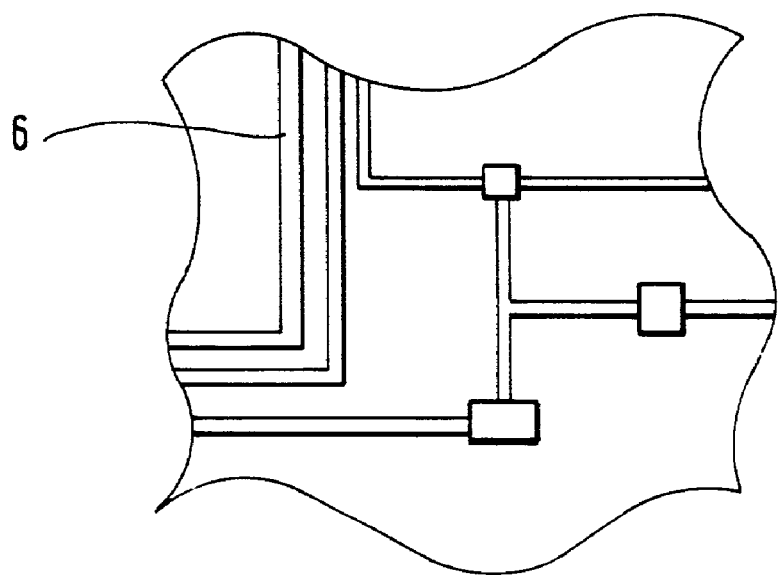
FIG. 2 shows a greatly enlarged detail of the chip of the smart card shown in FIG. 1 in a top view.

FIG. 2 shows a greatly enlarged detail of chip 5 from FIG. 1 in a top view. The special feature of FIG. 2 is that it shows the active surface of chip 5, i.e. it does not show all layers generally protecting the active layer of chip 5. In order to obtain information about the signal patterns in the interior of the chip one can for example contact exposed structures 6 with microprobes. Microprobes are very thin needles which are brought in electric contact with exposed structures 6, for example conductive paths, by means of a precision positioning device. The signal patterns picked up by the microprobes are processed with suitable measuring and evaluation devices with the aim of inferring secret data of the chip.

The invention makes it very difficult or even impossible for an attacker to gain access to in particular secret data of the chip even if he has managed to remove the protective layer of chip 5 without destroying the circuit and to contact exposed structures 6 of chip 5 with microprobes or intercept them in some other way. The invention is of course also effective if an attacker gains access to the signal patterns of chip 5 in another way.

FIGS. 3a, 3b, 3c and 3d show simple examples of lookup tables in which the input and output data each have a length of 2 bits. All table values are represented as binary data. The first line states input data x, and the second line output data y associated therewith in the particular column.

FIG. 3a shows a lookup table for undisguised function h. FIG. 3a indicates that input value x=00 has output value h(x)=01 associated therewith input value 01 output value 11, input value 10 output value 10, and input value 11 output value 00. The lookup table according to FIG. 3a represents nonlinear function h which is to be executed within the framework of a security-relevant operation. According to the invention, however, one does not use the lookup table shown in FIG. 3a itself in executing the security-relevant operation, but derives a disguised lookup table from said lookup table according to FIGS. 3b, 3c and 3d.

FIG. 3b shows an intermediate step in determining the disguised lookup table of FIG. 3c. The lookup table according to FIG. 3b was generated from the lookup table according to FIG. 3a by XORing each value of the first line of the table from FIG. 3a with random number $R_1$=11. Thus, XORing the value 00 of the first line and first column of the table from FIG. 3a with the number 11 yields the value 11, which is now the element of the first line and first column of the table of FIG. 3b. The remaining values of the first line of the table shown in FIG. 3b are determined accordingly from the values of the first line of the table shown in FIG. 3b are determined accordingly from the values of the first line of the bale shown in FIG. 3a and random number $R_1$=11. Basically the XOR function changes 00, 01, 10, and 11 of FIG. 3A to 11, 10, 01, 00. Since h(x) as shown in FIG. 3A maps 00 to 01, 01 to 11, 10 to 10 and 11 to 00, the result of disguising the input data would be to map 11 to 00, 10 to 10, 01 to 11, and 00 to 01. However, as shown in FIG. 3B, as a result of the disguised input data x, the operation is also disguised to become the disguised operation $h_{R_1}(x)$, so that 11 now maps to 01, 10 to 11, 01 to 10 and 00 to 00. The result is that the second line of FIG. 3B is exactly the same as the second line of FIG. 3A, but that the input data is disguised and the operation in the form of a mapping, is also disguised. Thus, table shown in FIG. 3b could already be used as a disguised lookup table for processing secret data likewise disguised with random number $R_1$=11. The result would be the plaintext values to be read in line 2 of this table from FIG. 3b.

One usually arranges the individual columns of a lookup table according to ascending input data x. A table determined by accordingly sorting the table in FIG. 3b is shown in FIG. 3c.

If the table according to FIG. 3c, which preserves the mapping or disguised input data and disguised operation of FIG. 3b, is to be disguised further or yield as output values likewise disguised values rather than plaintext values, one applies a further XOR operation with further random number $R_2$.

FIG. 3d shows the result of applying said further XOR operation. In said operation the elements of the second line of the table according to FIG. 3c are each XORed with random number $R_2$=10. The element in the second line and the first column of the table according to FIG. 3d thus results from XORing the element in the second line and first column of the table according to FIG. 3c with random number $R_2$=10. The further elements of the second line of the table according to FIG. 3d are formed accordingly. The first line of the table according to FIG. 3d is adopted by FIG. 3c unchanged.

With the table shown in FIG. 3d one can determine likewise disguised output data from disguised input data. The thus determined disguised output data can be supplied to further operations for processing disguised data or one can determine plaintext data therefrom by XORing with random number $R_2$=10.

Use of the table shown in FIG. 3d makes it possible to perform nonlinear operations with disguised secret data and protect said secret data from unauthorized access. The security-relevant operations themselves are still also protected from un-authorized access since differently disguised functions can be used at every execution of the operations and the security-relevant operations themselves cannot be inferred even if the disguised functions could be determined. After conversion to plaintext, however, both the original security-relevant operations and the operations performed with the aid of disguised functions yield identical results. For example, input value 00 yields output value 01 according to the table in FIG. 3a. In order to check whether the disguised table shown in FIG. 3d yields the same output value one must first XOR input value 00 with random number $R_1$=11. As a result of said combination one obtains the value 11. In order to determine the plaintext from said output value one must XOR the output value with random number $R_2$=10. As a result of said combination one obtains the value 01 which exactly matches the value determined with the aid of the table shown in FIG. 3a.

Disguising the security-relevant operations of the input values can be effected not only by XORing but also by other suitable types of combination, for example modular addition. Furthermore, the invention is not limited to the application of nonlinear functions represented by means of lookup tables. One can also use any nonlinear and even linear functions for which a suitable disguised function can be determined.

The invention claimed is:

1. A data carrier having a semiconductor chip with at least one memory containing an operating program which is able to carry out multiple executions of at least one operation (h), said multiple executions including a first execution of said operation (h) and at least one new execution of said operation (h), each of said multiple executions of the operation (h) requiring input data (x) and generating output data (y), characterized in that
  the operation (h) is disguised before each said new execution to obtain a new disguised operation ($h_{R1}$) that is a different operation than the operation (h), and
  the new disguised operation ($h_{R1}$) is executed with new disguised input data,
  wherein a random component is used in each new disguising of the operation (h) and the input data (x), and
  wherein each new disguising of the operation (h) and the input data (x) is coordinated such that the execution of the new disguised operation ($h_{R1}$) with new disguised input data yields output data (y) identical with the output data (y) determined upon execution of the operation (h) with input data (x),
  whereby disguising said operation (h) before each new execution prevents analysis of said operation (h) and exposure of secret information about said semiconductor chip should a potential attacker intercept signal patterns generated during execution of said disguised operation ($h_{R1}$).

2. A data carrier according to claim 1, characterized in that at least one random number ($R_1$) enters into the determination of the new disguised operation ($h_{R1}$) and the new disguised input data (x⊕$R_1$).

3. A data carrier according to claim 1, characterized in that the new disguised operation ($h_{R1}$) is generated from the operation (h) with the aid of XOR operations and the new disguised input data is generated from the input data (x) with the aid of XOR operations.

4. A data carrier according to claim 1, characterized in that at least two disguised operations ($h_{R1}$, $h_{R1'}$) are permanently stored in the data carrier in advance and one of the stored disguised operations ($h_{R1}$, $h_{R1'}$) is selected randomly as the new disguised operation when the new disguised operation is to be executed.

5. A data carrier according to claim 1, characterized in that the new disguised operation ($h_{R1}$) is recalculated before its execution and the at least one random number ($R_1$) is redetermined for said calculation.

6. A data carrier according to claim 1, characterized in that the operation (h) is realized by a table stored in the data carrier which establishes an association between the input data (x) and the output data (y).

7. A data carrier according to claim 6, characterized in that the disguising of the input data (x) contained in the table is effected by combination with the at least one random number ($R_1$).

8. A data carrier according to claim 1, characterized in that the operation (h) is a nonlinear operation with respect to the combination used for disguising the operation (h).

9. A data carrier having a semiconductor chip (5) with at least one memory containing an operating program which is able to carry out multiple executions of at least one operation (h), said multiple executions including a first execution of said operation (h) and at least one new execution of said operation (h), each of said multiple executions of the operation (h) requiring input data (x) and generating output data (y), characterized in that
  the operation (h) is disguised before each said new execution to obtain a new disguised operation ($h_{R1}$) that is a different operation than the operation (h),
  the new disguised operation ($h_{R1}$) is executed with new disguised input data,
  wherein a random component is used in each new disguising of the operation (h) and the input data (x), and the new disguising of the operation (h) and the input data (x) is coordinated such that the execution of the new disguised operation ($h_{R1R2}$) with new disguised input data yields new disguised output data which are disguised relative to the output data (y) determined upon execution of the operation (h) with input data (x), and
  the output data (y) can be determined from the new disguised output data with the aid of data ($R_2$) used for disguising the operation (h),
  whereby disguising said operation (h) before each new execution prevents analysis of said operation (h) and exposure of secret information about said semiconductor chip should a potential attacker intercept signal patterns generated during execution of said new disguised operation ($h_{R1}$).

10. A data carrier according to claim 9, characterized in that at least one random number ($R_1$) enters into the determination of the new disguised input data (x⊕$R_1$) and at least two random numbers ($R_1$, $R_2$) enter into the determination of the new disguised operations ($h_{R1R2}$).

11. A data carrier according to claim 9, characterized in that the new disguised operation ($h_{R1R2}$) is generated from the input data (x) with the aid of XOR operations and the new disguised input data is generated from the input data (x) with the aid of XOR operations.

12. A data carrier according to claim 9, characterized in that at least two disguised operations ($h_{R1R2}$, $h_{R1'R2'}$) are permanently stored in the data carrier in advance and one of the stored disguised operations ($h_{R1R2}$, $h_{R1'R2'}$) is selected randomly as the new disguised operation when the new disguised operation is to be executed.

13. A data carrier according to claim 12, characterized in that the random numbers ($R_1$, $R_2$) for determining the first disguised operation ($h_{R1R2}$) are inverse to the random numbers ($R_1'$, $R_2'$) for determining the second disguised operation ($h_{R1'R2'}$) with respect to the combination used for determining the new disguised operations ($h_{R1R2}$, $h_{R1'R2'}$).

14. A data carrier according to claim 9, characterized in that the new disguised operation ($h_{R1R2}$) is recalculated before its execution and the random numbers ($R_1$, $R_2$) are redetermined for said calculation.

15. A data carrier according to claim 9, characterized in that the operation (h) is realized by a table stored in the data carrier which establishes an association between the input data (x) and the output data (y).

16. A data carrier according to claim 15, characterized in that the disguising of the input data (x) contained in the table is effected by combination with the at least one random number ($R_1$) and the disguising of the output data (y) contained in the table is effected by combination with the at least one further random number ($R_2$).

* * * * *